United States Patent
Shieh

(10) Patent No.: US 11,643,080 B2
(45) Date of Patent: May 9, 2023

(54) TRAILING VEHICLE POSITIONING SYSTEM BASED ON DETECTED PRESSURE ZONES

(71) Applicant: Toyota Motor Engineering & Manufacturing North America, Inc., Plano, TX (US)

(72) Inventor: Tenghua Shieh, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 17/065,392

(22) Filed: Oct. 7, 2020

(65) Prior Publication Data
US 2022/0105934 A1   Apr. 7, 2022

(51) Int. Cl.
*B60W 30/16* (2020.01)
*B60W 30/165* (2020.01)
*B60W 40/10* (2012.01)
*B60W 40/04* (2006.01)
*B60W 40/06* (2012.01)
*G06V 20/58* (2022.01)

(52) U.S. Cl.
CPC ........ *B60W 30/162* (2013.01); *B60W 30/165* (2013.01); *B60W 40/04* (2013.01); *B60W 40/06* (2013.01); *B60W 40/1005* (2013.01); *G06V 20/584* (2022.01); *B60W 2530/16* (2013.01); *B60W 2554/80* (2020.02); *B60W 2556/50* (2020.02); *G06V 2201/08* (2022.01)

(58) Field of Classification Search
CPC ... B60W 30/16; B60W 30/162; B60W 30/165
See application file for complete search history.

(56) References Cited

U.S. PATENT DOCUMENTS

| | | |
|---|---|---|
| 8,352,112 B2 | 1/2013 | Mudalige |
| 9,067,602 B2 | 6/2015 | Baek |
| 9,145,137 B2 | 9/2015 | Doi et al. |
| 9,616,743 B1 | 4/2017 | Mays et al. |
| 9,725,091 B2 | 8/2017 | Dempsey et al. |
| 10,017,179 B2 | 7/2018 | Alden et al. |
| 10,059,330 B2 | 8/2018 | Gaither et al. |
| 10,096,067 B1 | 10/2018 | Slusar |

(Continued)

FOREIGN PATENT DOCUMENTS

| | | |
|---|---|---|
| DE | 10 2010 028 637 A1 | 11/2011 |
| DE | 10 2016 012 465 A1 | 5/2017 |

(Continued)

*Primary Examiner* — Imran K Mustafa
(74) *Attorney, Agent, or Firm* — Snell & Wilmer LLP

(57) ABSTRACT

A system for controlling platooning by a following vehicle includes a main body of the following vehicle. The system further includes a pressure sensor located in or on the main body and configured to detect a pressure corresponding to a pressure wake from a leading vehicle. The system further includes an electronic control unit (ECU) located in or on the main body, coupled to the pressure sensor, and configured to determine an optimal distance from the following vehicle to the leading vehicle based on the detected pressure. The optimal distance corresponding to a distance at which drag applied to the following vehicle is reduced based on the pressure wake from the leading vehicle.

18 Claims, 8 Drawing Sheets

(56) References Cited

U.S. PATENT DOCUMENTS

| | | | | |
|---|---|---|---|---|
| 2013/0080018 A1* | 3/2013 | Baek | ................ | G01L 15/00 |
| | | | | 701/1 |
| 2020/0276974 A1* | 9/2020 | Tulpule | ............ | B60W 30/1882 |
| 2021/0213948 A1* | 7/2021 | Lahti | ................ | B60W 30/146 |

FOREIGN PATENT DOCUMENTS

| | | | |
|---|---|---|---|
| DE | 10 2016 012 349 A1 | 4/2018 | |
| DE | 10 2018 203 806 A1 | 9/2019 | |
| EP | 3 367 064 A1 | 8/2018 | |
| WO | 2013/147682 A1 | 10/2013 | |
| WO | 2014/133425 A1 | 9/2014 | |
| WO | WO-2014133425 A1 * | 9/2014 | ........... G05D 1/0293 |
| WO | 2017/119541 A1 | 7/2017 | |

\* cited by examiner n (number of platooning vehicle) = 2

420

| Vehicle | Length(m) | Area(m$^2$) |
|---|---|---|
| Light Sedan | 4.5 | 2.1 |
| Medium Sedan | 4.7 | 2.3 |
| Light Duty Truck | 5.4 | 2.8 |
| Minivan | 4.9 | 3.1 |
| Full SUV | 5.0 | 3.2 |

TRAILING VEHICLE POSITIONING SYSTEM BASED ON DETECTED PRESSURE ZONES

BACKGROUND

1. Field

The present disclosure relates to systems and methods for controlling platooning by a following vehicle and, more particularly, to systems and methods for increasing vehicle efficiency using drag force estimations during platooning.

2. Description of the Related Art

Some autonomous vehicle fleets may be designed to platoon such that they follow each other in close proximity where speed and driving operations are controlled as a fleet. However, in manual vehicles, semi-autonomous vehicles, or fully autonomous vehicles traveling separate from a fleet, it is desirable for the driver or the vehicle to remain a safe distance behind a leading vehicle.

Wind resistance may reduce energy efficiency of a vehicle. It follows then that reducing wind resistance at a front of a vehicle will increase energy efficiency. Due to the wake generated by vehicles, a pressure wave is produced behind them. If the pressure wave is timed such that a front end of a trailing vehicle is located in a low pressure portion of the wave and a rear end of the trailing vehicle is located in a high pressure portion of the wave then the trailing vehicle will experience reduced wind resistance at a front end of the vehicle and increased pressure behind the vehicle propelling the vehicle forward.

However, information regarding pressure waves of multiple vehicle types is unknown. Because each vehicle shape will produce a different pressure wave, it is not possible to create a formula or select a generalized trailing distance that will provide this benefit regardless of the leading vehicle.

Thus, there is a need in the art for systems and methods for optimizing platooning by a following vehicle.

SUMMARY

Described herein is a system for controlling platooning by a following vehicle. The system includes a main body of the following vehicle. The system further includes a pressure sensor located in or on the main body and configured to detect a pressure corresponding to a pressure wake from a leading vehicle. The system further includes an electronic control unit (ECU) located in or on the main body, coupled to the pressure sensor, and configured to determine an optimal distance from the following vehicle to the leading vehicle based on the detected pressure, the optimal distance corresponding to a distance at which drag applied to the following vehicle is reduced based on the pressure wake from the leading vehicle.

Also disclosed is a system for controlling platooning by a following vehicle. The system includes a main body of the following vehicle having a front end and a rear end. The system further includes a first pressure sensor and a second pressure sensor each located in or on the main body and configured to detect pressure data corresponding to a pressure wake from a leading vehicle, the first pressure sensor being located closer to the front end than the second pressure sensor. The system further includes an electronic control unit (ECU) located in or on the main body, coupled to the pressure sensor, and configured to determine an optimal distance from the following vehicle to the leading vehicle based on the pressure data, the optimal distance corresponding to a distance at which drag applied to the following vehicle is reduced based on the pressure wake from the leading vehicle.

Also disclosed is a method for controlling platooning by a following vehicle. The method includes detecting, by a pressure sensor of the following vehicle, a pressure corresponding to a pressure wake from a leading vehicle. The method further includes determining, by an electronic control unit (ECU) of the following vehicle, an optimal distance from the following vehicle to the leading vehicle based on the detected pressure, the optimal distance corresponding to a distance at which drag applied to the following vehicle is reduced based on the pressure wake from the leading vehicle.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1A:
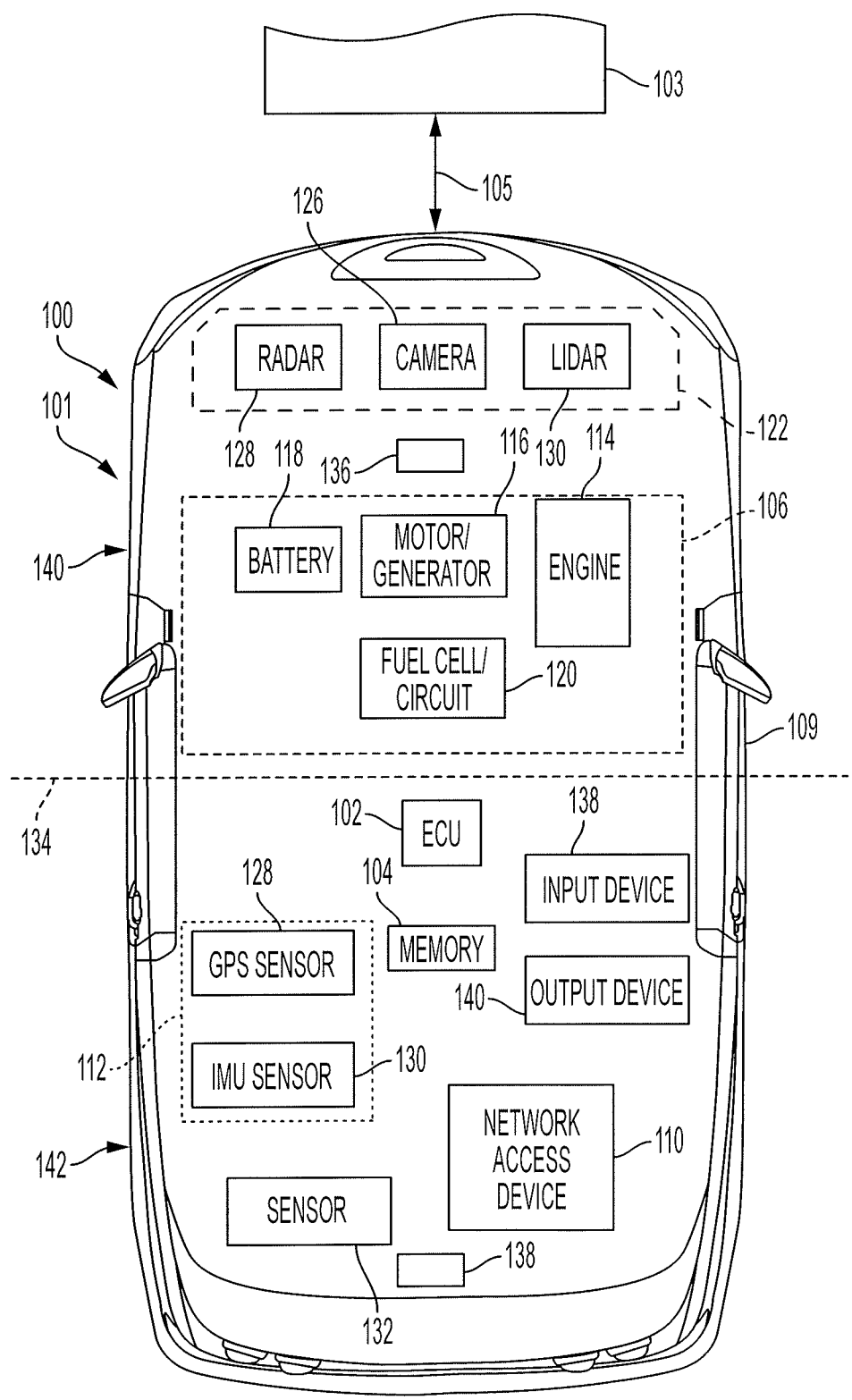
FIG. 1A is a block diagram illustrating a vehicle having a system for controlling platooning behind a leading vehicle to increase fuel efficiency according to an embodiment of the present invention.

The present disclosure describes systems and methods for controlling platooning by a following vehicle. The system can advantageously determine wake profile data or drag force data corresponding to a pressure wake behind a leading vehicle, and can determine an optimal following distance for the following vehicle to remain behind the leading vehicle based on the wake profile or drag force. The optimal distance advantageously increases fuel or energy efficiency of the following vehicle, thus saving fuel and reducing costs of driving. The system advantageously may include multiple pressure sensors to detect pressure corresponding to the pressure wake of the leading vehicle, which provides the benefit of improved calculation of the optimal distance based on actual pressure applied to the following vehicle.

The system can advantageously autonomously control the following vehicle to remain the optimal distance behind the leading vehicle during autonomous driving or during adaptive cruise control mode, reducing effort of a driver to achieve the savings. The system also provides the advantage of reducing swings in acceleration or deceleration (i.e., will fluctuate from the optimal distance in certain situations) in order to provide a smoother ride.

The system provides additional benefits such as continuously or periodically calculating new drag force or wake profile data of various potential leading vehicles and selecting a new leading vehicle that will provide greater fuel efficiency benefits than a current leading vehicle. The system also advantageously will select a greater optimal distance in response to a leading vehicle being human-driven rather than autonomously-driven in order to increase safety.

An exemplary system includes one or more pressure sensor located in or on a following vehicle that detects pressure data corresponding to the pressure wake left behind a leading vehicle. For example, the following vehicle may include a first pressure sensor towards a front of the vehicle and a second pressure sensor towards a rear of the vehicle. The system may further include an electronic control unit (ECU) coupled to the pressure sensor(s). The ECU may determine characteristics corresponding to the pressure wake behind the leading vehicle based on the detected pressure data (and potentially based on other information such as a current vehicle speed, a shape of the leading vehicle, or the like). The ECU may also determine an optimal distance to platoon, or follow, behind the leading vehicle. The optimal distance is a distance at which drag applied to the following vehicle is reduced and is based on the data corresponding to the pressure wake from the leading vehicle.

Due to the wake generated by vehicles, a pressure wave is produced behind them. Accordingly, vehicles disrupt the atmosphere and pressure leaving a trail of atmospheric turbulence while moving. Each vehicle creates a predictable wake or drag profile depending on the type of vehicle, the vehicle shape, and features on the vehicle (such as spoilers). The closer a following vehicle is to a lead vehicle, the less drag or wind resistance the following vehicle will face. This is due to the lead vehicle breaking the wind barrier and absorbing the brunt of the wind resistance. A following vehicle may experience decreased drag the further behind a leading vehicle it is traveling, however, the decreased drag is not a linear digression. Simulations have shown that the pressure wake of a vehicle creates a predictable pattern or profile based on various features such as vehicle type, vehicle shape, and other parameters.

Accordingly, it is possible to predict or estimate the type of drag wave left behind by a leading vehicle given any number of variables and parameters (pressure data detected at one or more location on the following vehicle, a shape of the lead vehicle, wind, road, terrain, altitude, temperature, and cross-talk impact from other vehicles and external objects (e.g., bridges, barriers, trees, open fields, etc.)). Furthermore, simulation software can determine an amount of drag force exerted on a trailing vehicle based on variable distance behind a lead vehicle. The optimal distance to generate the least amount of drag force working against a trailing vehicle (minimum drag) is based on, for example, vehicle parameters and external variables mentioned above. However, no technology previously existed where the simulation data is used to build a database of identifiable drag profiles that provide unique characteristics of a wake pattern or wave print of a vehicle according to various vehicle categories (e.g., vehicle type, shape, size, etc.) including specific vehicle types (e.g., make, model, year, options, aftermarket add-ons, etc.).

For instance, when vehicles travel they create a drag wake which generally follows a dispersing wave pattern. The wind resistance is broken by a lead vehicle while a trailing vehicle may benefit from the wake of a lead vehicle. However, in some areas in a drag wake of a leading vehicle, a trailing vehicle may experience greater than nominal wind resistance (i.e., resistance if no lead vehicle was present) because the drag profile follows a wave-like pattern. As in most waves, being in frequency allows harmonious results while being out of frequency, similar to being out of rhythm with a beat, creates clash and disruption of the medium.

Accordingly, it is desirable for a trailing vehicle to follow within a valley, for example, in a sine wave configuration, where the vehicle experiences high pressure at rear surfaces of the vehicle (e.g., rear window, trunk area, rear cargo door, etc.) above the nominal pressure (i.e., without a lead vehicle in front). Similarly, the vehicle should experience a low pressure along forward-facing surfaces (e.g., front windshield, grill, etc.) due to driving behind a lead vehicle in a valley or low-pressure zone. This location in the valley, or low-pressure zone, is where the high pressure in the rear pushes the vehicle forward and the low pressure in the front produces reduced wind resistance (as compared to a lack of leading vehicle), thus increasing vehicle efficiency. This allows the trailing vehicle to take advantage of the aerodynamic improvement of driving in a low-pressure zone or sweet spot behind a lead vehicle.

The present disclosure provides systems and methods for controlling platooning by a following vehicle by determining data corresponding to the pressure wake behind a leading vehicle. The system may determine the wake pressure data based on various pieces of information such as pressure sensors located on the following vehicle, based on image data of the leading vehicle, based on a vehicle speed of the vehicles, or the like. The pressure sensors are able to detect external pressures along a front surface and a rear surface of the vehicle. For example, such pressure sensors may detect relevant pressures if mounted along surfaces absorbing a relatively large amount of wind resistance (e.g., a windshield or a grill) and those surfaces causing the most drag (e.g., a rear window or windshield, a trunk, or the like). By referencing simulation databases (e.g., saved locally, remotely, or some combination thereof using a cloud or remote server) to determine an optimal following distance behind the leading vehicle to minimize drag force that may reduce fuel or energy efficiency of the following vehicle. The present disclosure provides such benefits by estimating the amount of drag force exerted on the trailing vehicle at any distance behind the lead vehicle based on the lead vehicle drag wake data.

As the trailing vehicle is trailing a lead vehicle, the front and rear pressure zones are monitored to detect where in the wake of the lead vehicle the trailing vehicle is located (e.g., is the front pressure zone of the following vehicle in a peak or valley of the wake). The pressure data can be used to optimize the following distance behind the leading vehicle. For example, if the front pressure reading is greater than a nominal pressure reading (e.g., without a leading vehicle) and the rear pressure reading is less than nominal then the trailing vehicle is in a disadvantaged drag position.

The trailing vehicle may continue to modify the distance as the front and rear pressure values are continuously or periodically monitored. If the system determines that the rear pressure values are greater than nominal (e.g., if rear winds are providing acceleration) then the system may determine that an improved position has been obtained. Based on this information and based on the anticipated wave pattern, the system may notify the driver to continue the trending direction or maintain the current following distance. Likewise, if the front pressure values are less than nominal, the same result and improvement of fuel efficiency may be achieved.

Once the vehicle has obtained improved front and rear pressure values, the vehicle may determine that the following vehicle is in a valley of the drag wave and an optimal distance has been achieved.

Figure 1B:
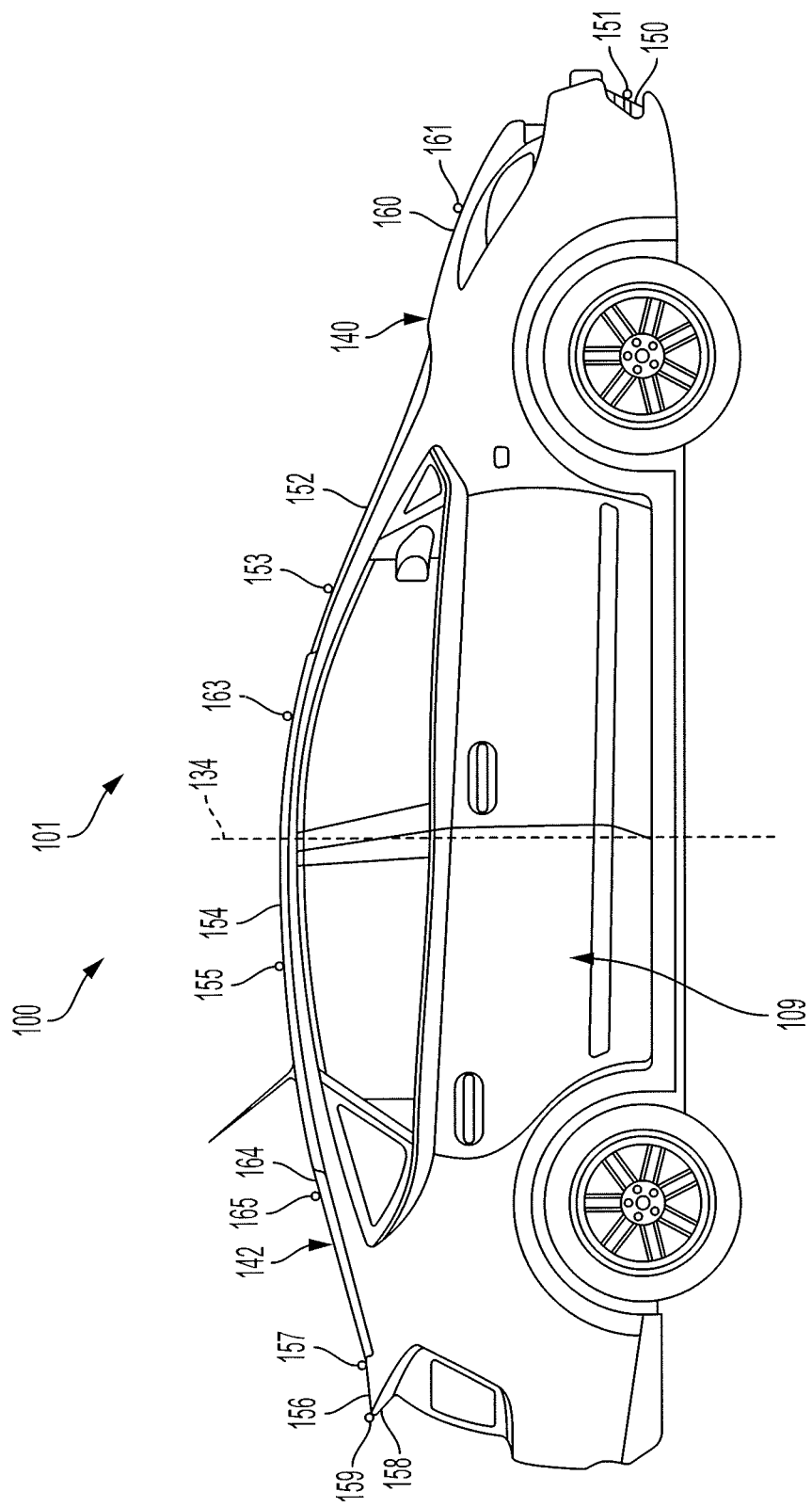
FIG. 1B is a drawing illustrating a profile view of the vehicle of FIG. 1A according to an embodiment of the present invention.

Turning to FIGS. 1A and 1B, a vehicle 100 may include a system 101 for controlling platooning of the vehicle 100. Platooning refers to a method for driving a group (e.g., two or more) of vehicles together. Pressure waves may be present behind a leading (e.g., front) vehicle 103. Depending on how the pressure waves hit a following (e.g., rear) vehicle 100, the pressure waves may cause the following vehicle 100 to either increase or decrease in efficiency. For example, an increase in drag force on the vehicle 100 will decrease vehicle efficiency by slowing down the vehicle 100 and consuming excess fuel and/or stored energy, and a decrease in drag force on the vehicle 100 will increase vehicle efficiency. The drag force applied to the vehicle 100 changes with distance between the vehicles as the pressure wake behind the leading vehicle 103 may have a periodic shape rather than a flat, or linear, shape.

The position of the pressure waves on the following vehicle 100 and the effects of the pressure waves may be based on various factors such as a shape of the leading vehicle 103, a distance 105 between the leading vehicle 103 and the following vehicle 100, a speed of the vehicles 100, 103, and road data (e.g., wind speed, wind direction, grade of the current roadway, precipitation, or the like). It is possible to calculate, determine, or predict the drag force (and/or a wake profile) applied to the vehicle 100 based on the above factors. It is therefore desirable to utilize systems and methods for determining or estimating drag force applied to the vehicle 100 and determining an optimal distance between vehicles based on the drag force. Such determinations may be implemented in order to achieve significant savings in fuel or energy efficiency.

The vehicle 100 (or system 101) may include an ECU 102, a memory 104, a power source 106, and a main body 109. The vehicle 100 (or system 101) may further include a network access device 110, an image sensor 122, a location sensor 124, and a sensor 132. The vehicle 100 may further include a front pressure sensor 136 and a rear pressure sensor 138. The vehicle 100 may also include an input device 138 and an output device 140.

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individual such as a driver, a passenger, or the like.

The main body 109 may have a front half 140 and a rear half 142 separated by a centerline 134. The centerline 134 may be directly between a front end and a rear end of the main body 109. The front pressure sensor 136 may be located on the main body 109 on the front half 140, and the rear pressure sensor 138 may be located on the main body 109 on the rear half 142.

The ECU 102 may be coupled to each of the components of the vehicle 100 and may include one or more processors or controllers which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations. In some embodiments, the ECU 102 may be designed to perform artificial intelligence or machine learning functions. In that regard, the ECU 102 may be a machine learning ECU.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality. The ECU 102 may also, for example, make determinations based on data detected by the image sensor 122, the location sensor 124, and/or the sensor 132. For example, the ECU 102 may determine information corresponding to drag force of the leading vehicle 103 or a wake profile of the leading vehicle 103, and may determine optimal platooning control of the vehicle 100 based on the determined information.

The memory 104 may include any non-transitory memory and may store data usable by the ECU 102. For example, the memory 104 may store instructions usable by the ECU 102 to drive autonomously (which may include fully autonomous driving or partial autonomous driving such as adaptive cruise control). The memory 104 may further store data associating shapes of leading vehicles 103 with corresponding drag force or wake profile data, and the ECU may determine the platooning distance 105 based on the stored data. The memory 104 may be located in or on the main body 109 and may thus be referred to as a local memory.

The power source 106 may include any one or more of an engine 114, a motor-generator 116, a battery 118, and a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like. The battery 118 may be used to store power usable by the motor generator 116, power usable to start the engine 114, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116 or other electrical components of the vehicle 100. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a current location of the vehicle 100. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The location sensor 112 may be used to determine various road data corresponding to a current or upcoming roadway on which the vehicle 100 is traveling. The road data may include, for example, information indicating whether the vehicle 100 is traveling through a tunnel, over an overpass, a grade of the current or upcoming roadway, a curve of the roadway (including an angle of the curve), a current wind speed, a current wind direction, precipitation (e.g., rain, snow, sleet, etc.), a current temperature, or an elevation of the current roadway. For example, the ECU 102 may transmit the current location of the main body 109 to a remote device (not shown), and may receive the road data in response. As another example, the memory 104 may store some road data (e.g., a grade, a tunnel, or the like), and the ECU 102 may compare the current location to the stored data to determine the current road data.

The image sensor 122 may be coupled to the main body 108 and may detect image data corresponding to an environment of the vehicle 100. For example, the image sensor 122 may include a camera 126, a radar detector 128, a lidar detector 130, or any other image sensor capable of detecting light having any wavelength. The image sensor 122 may include one or multiple image sensors which may be oriented to detect image data in any direction relative to the main body 109. For example, the image sensor 122 may include four or more radar detectors to detect radar data on all four sides of the main body 109. The image sensor 122 may also or instead include a first camera to detect image data in a forward direction relative to the main body 109 and a second camera to detect image data in a rear direction relative to the main body 109.

The data from the image sensor 122 may include information corresponding to a shape of a leading vehicle 103. For example, the shape may include a general shape of the vehicle 103, specific features of the vehicle 103, a specific type of the vehicle 103 (e.g., a sedan, a coupe, a minivan, a sports utility vehicle (SUV), or the like), or a specific make and/or model of the vehicle 103. In some embodiments, the data from the image sensor 122 may further be used to determine a current distance between the main body 109 and the leading vehicle 103.

The sensor 132 may include one or more of a sensor capable of detecting road data (as described above) including environmental conditions (e.g., weather conditions), a voltage sensor, a current sensor, a temperature sensor, a pressure sensor, a fuel gauge, an airflow sensor, an oxygen sensor, or the like.

The front pressure sensor 136 may be located on an outside of the main body 109 at any location on the front half 140. For example, the main body 109 may include a grill 150, a front windshield 152, a hood 160, a roof 154, or the like. The front pressure sensor 136 may include any one or more of a first pressure sensor 151 located on the grill 150, a second pressure sensor 153 located on the windshield 152, a third pressure sensor 161 located on the hood 160, a fourth pressure sensor 163 located on the roof 154 (on the front half 140), or the like.

The rear pressure sensor 138 may be located on an outside of the main body 109 at any location on the rear half 142. For example, the main body 109 may include a trunk 156, a spoiler 158, a rear windshield 164, or the like. The rear pressure sensor 138 may include any one or more of a fifth pressure sensor 155 located on the roof 154 (on the rear half 142), a sixth pressure sensor 157 located on the trunk 156, a seventh pressure sensor 159 located on the spoiler 158, an eighth pressure sensor 165 located on the rear windshield 164, or the like.

The pressure sensors 136, 138 may include any sensors capable of detecting pressure data corresponding to a pressure wake behind the leading vehicle 103. For example, the pressure sensors 136 may include any one or more of a potentiometric pressure sensor, an inductive pressure sensor, a capacitive pressure sensor, a piezoelectric pressure sensor, a strain gauge pressure sensor, a variable reluctance pressure sensor, or the like. The pressure sensors 136, 138 may include any quantity of pressure sensors. In some embodiments, it may be desirable for the vehicle 100 to include at least the front pressure sensor 136 and the rear pressure sensor 138. In some embodiments, it may be desirable to include at least three pressure sensors including the front pressure sensor 136, the rear pressure sensor 138, and a third pressure sensor between the front pressure sensor 136 and the rear pressure sensor 138.

The ECU 102 may use the data from the memory 104, the location sensor 124, the image sensor 122, the sensor 132, and the pressure sensors 136, 138 to determine an optimal platooning distance from the main body 109 of the following vehicle 100 to the leading vehicle 103. In various embodiments, the ECU 102 may implement an artificial intelligence, or machine learning, algorithm to continually improve the quality of the optimal distance calculation. In some embodiments, the ECU 102 may control the power source 106 and any steering elements to cause the main body 109 to remain within a predetermined amount of the optimal distance from the leading vehicle 103. The predetermined amount may be any amount that is sufficiently close to the optimal distance that the benefits of timing the pressure wave from the leading vehicle 103 are still achieved. For example, the predetermined amount may be provided as a percentage (e.g., within 3 percent (3%), 5%, 10%, or the like of the optimal distance) or as an absolute distance (e.g., within 1 foot, 3 feet, 5 feet, 10 feet, 15 feet, or the like of the optimal distance).

In particular, the ECU 102 may utilize machine learning and image recognition to identify the lead vehicle 103 by one or more vehicle features (e.g., shape, make, model, year, license plate number, accessories, or the like). For example, the ECU 102 may cross reference the one or more features to a vehicle database or register to identify the lead vehicle. After identifying the lead vehicle, the ECU 102 may pull simulation data from a vehicle drag profile database to procure a baseline drag signature. In some embodiments, the ECU 102 may calculate the baseline drag signature further using the detected pressure data. The baseline drag signature may provide the variable drag force and turbulence signature at any point along the wake of the lead vehicle 103. This point may equate to a distance as a function of speed and time. The baseline drag signature may provide simulation data using real-time vehicle parameters and actual environmental variables (e.g., road data including road slope and curves, type of terrain, weather, interference from other vehicles or drag wakes, or the like).

In some embodiments, the ECU 102 may make adjustments to the optimal distance based on the detected pressure data. For example, the ECU 102 may determine the baseline drag signature based on image data and/or other data, may select an optimal following distance, and then may utilize the detected pressure data to verify that the optimal following distance is accurate. In some embodiments, the ECU 102 may select the optimal distance based only on pressure data, or on any combination of pressure data and other data.

In some embodiments, the ECU 102 may continue to monitor the vehicle data, road data, and actual drag forces to evaluate the estimated drag force data to readjust the determination of the optimal distance or position.

In terms of overall performance, vehicle range, cost, comfort, and fuel or energy efficiency, simulations illustrate that lead vehicles having a large, box shaped, bluff body that exhibit driving patterns that are smooth and consistent (both regarding acceleration and braking) appear more favorable than other vehicles. Accordingly, the ECU 102 may continue to identify other vehicles on the roadway to determine if a different leading vehicle would provide greater benefits. Such processes may be similar as those described above such that the ECU 102 identifies vehicles as they are passed using machine learning and image recognition. The drag profile of each vehicle may be retrieved to determine if the candidate vehicle is a better fit as a lead vehicle than the present lead vehicle 103. If so, the driver or autonomous vehicle may be alerted and passengers notified via the output device 140 to provide the driver or passengers with an option to change lead vehicles. In some embodiments, the ECU 102 may instead simply inform the driver or passengers as to the reason for the change in lead vehicles.

The input device 138 may include any one or more input device such as a button, a keyboard, a mouse, a touchscreen, a microphone, or the like. The input device 138 may receive input from a user of the vehicle 100 such as a driver or a passenger. In some embodiments, the network access device 110 may be considered an input device as it may receive input from a remote device associated with a vehicle user. The input device 138 may receive data such as steering data, control of various features of the vehicle 100 (e.g., a cruise control selection device), or the like.

The output device 140 may include any output device such as a speaker, a display, a touchscreen, or the like. The output device 140 may output data to a user of the vehicle such as a representation of the optimal distance. The representation may be given as a value (e.g., "25 yards"), as a visual representation (e.g., showing a green light if the vehicle is within the predetermined amount of the optimal distance and showing a red light otherwise), or the like. The network access device 110 may likewise be considered an output device as it may transmit output data to a remote device (e.g., a tablet, laptop, or mobile phone), where it may be output to a vehicle user.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wireless protocol. The network access device 110 may be referred to as a data communication module (DCM) and may communicate with any device on the vehicle 100 and/or any remote device. For example, the network access device 110 may communicate with at least one of a remote server (such as a cloud server or other central server), a remote memory, or a remote device (such as a mobile telephone, a laptop, a tablet, a desktop computer, a PDA, or the like). The network access device 110 may receive data from the remote device such as road data. In some embodiments, the network access device 110 may communicate with other vehicles (e.g., the vehicle 103) and may receive an identifier of the vehicle type from the other vehicles. In such embodiments, the ECU 102 may determine the optimal distance based on the received vehicle type. In some embodiments, the data referred to herein as stored in the memory 104 may also or instead be stored in a remote memory accessed by the network access device 110.

Figure 2:
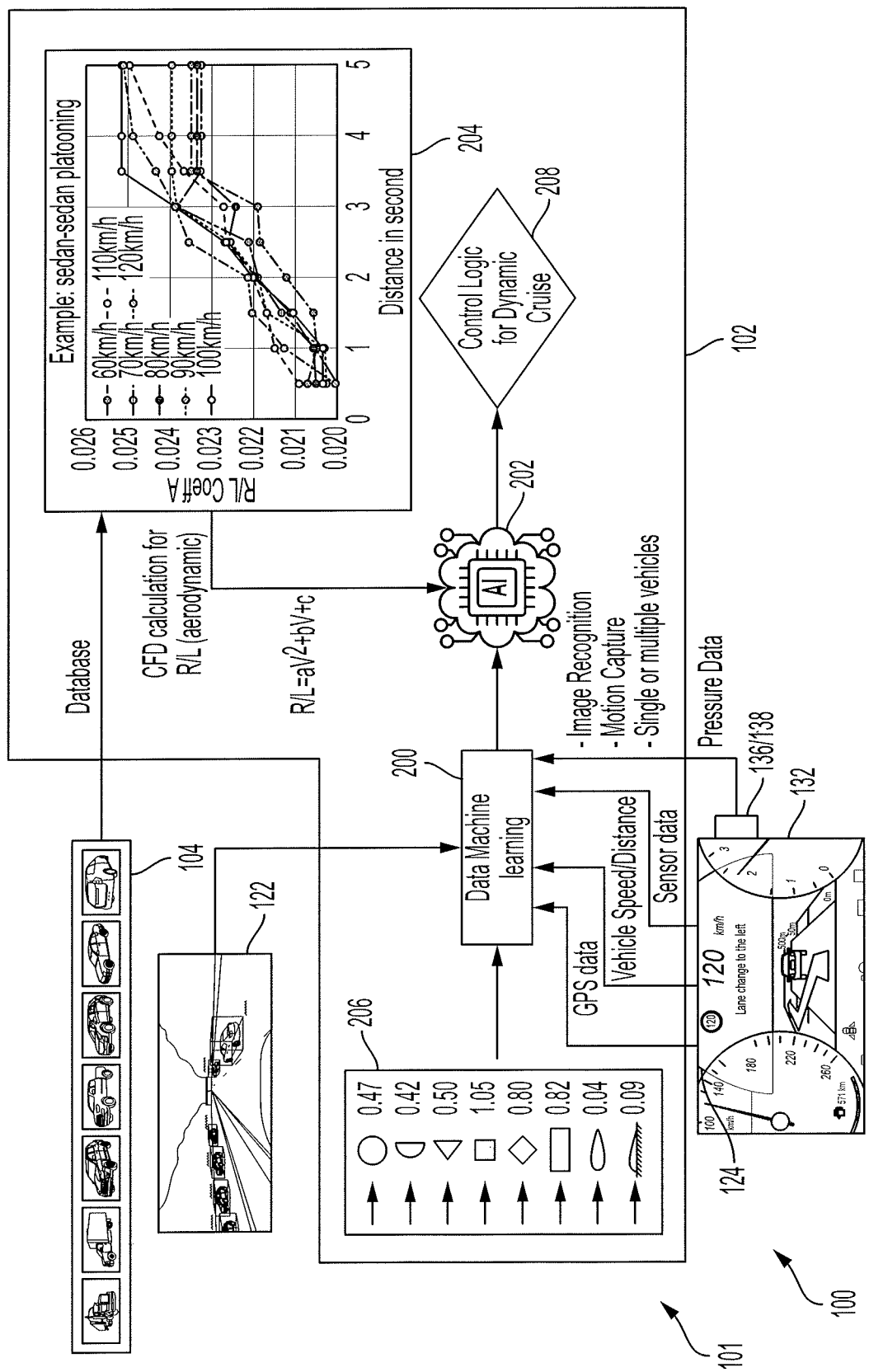
FIG. 2 illustrates various features of the system of FIG. 1A according to an embodiment of the present invention.

Referring now to FIG. 2, an exemplary implementation of the system 101 is shown. In particular, the ECU 102 may include a shape recognition algorithm 206. The ECU 102 may further include a data machine learning algorithm 200, an artificial intelligence algorithm 202, and a lookup table 204. In various embodiments, the lookup table 204 may be retrieved from the memory 104 based on a type or shape of leading vehicle.

The data machine learning algorithm 200 may receive various pieces of information such as image data from the image sensor 122, an identification of a shape of a leading vehicle or a type of the leading vehicle, location data from the location sensor 124, a current vehicle speed, road data from the sensor 132, pressure data from the pressure sensors 136, 138, or the like. The data machine learning algorithm 200 may determine information based on the inputs. For example, the data machine learning algorithm 200 may determine an identification of the leading vehicle type using machine learning. As another example, the data machine learning algorithm 200 may determine a distance between the present vehicle 100 and the leading vehicle based on the sensor data, and may further determine road data based on the sensor data.

The ECU 102 may determine an applicable lookup table 204 based on the determination of the type or shape of the leading vehicle. For example, the memory 104 may store multiple lookup tables each corresponding to a particular leading vehicle shape or type. In response to the ECU 102 identifying the type or shape of the leading vehicle, the ECU 102 may retrieve the associated lookup table from the memory 104.

The artificial intelligence algorithm 202 may receive the determinations from the data machine learning algorithm 200 and may access the corresponding lookup table 204. The artificial intelligence algorithm 202 may determine control logic 208 usable to at least one of output an optimal distance between the vehicle 108 leading vehicle or control the power source of the vehicle 100 to remain within a predetermined amount of the optimal distance from the leading vehicle. As an example, the lookup table 204 may associate a drag force estimation or a wake profile with a distance between vehicles for various speeds. Each lookup table may make this association for a different leading vehicle type or shape. In some embodiments, the lookup table 204 may be replaced by an equation or other calculation that determines a drag force or wake profile for a leading vehicle at various speeds. In some embodiments, the lookup tables or the equations or calculations may be determined by modeling drag force or wake profiles of vehicles and, in some embodiments, the lookup tables, equations, or calculations may be determined based on testing of vehicles in various situations. The artificial intelligence algorithm may further learn to adjust calculations or determinations based on received pressure data from the pressure sensors 136, 138.

The control logic 208 may be determined by the artificial intelligence algorithm 202 based on the data in the lookup table 204 and based on the determinations of the data machine learning algorithm 200. In some embodiments, the artificial intelligence algorithm 202 may receive feedback from one or more sensor of the vehicle 100 (e.g., corresponding to fuel efficiency, detected pressure values, power consumption, or the like) which may indicate an accuracy of the determined optimal distance. In such embodiments, the artificial intelligence algorithm 202 may continuously update to improve the determination of the optimal distance.

Referring now to FIGS. 1A, 1B, and 2, the control logic 208 may instruct the output device 140 to output data corresponding to the optimal distance between the vehicle 100 and the leading vehicle 103. Alternatively or in addition, the control logic 208 may be used to control the power source 106 (e.g., as adaptive cruise control or in a semi- or fully-autonomous mode) to cause the main body 109 to remain within a predetermined amount of the optimal distance from leading vehicle 103.

Figure 3A:
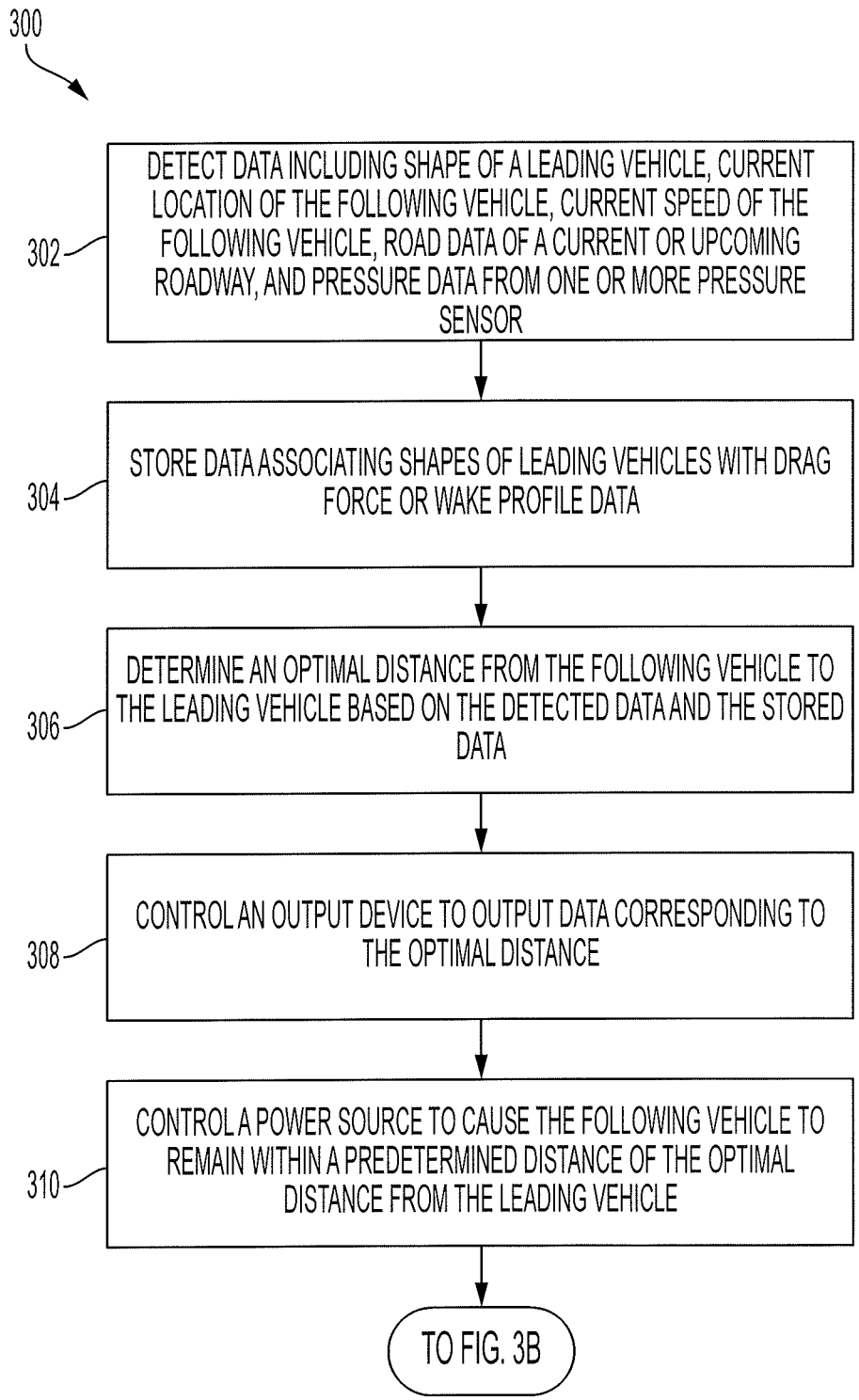
FIGS. 3A and 3B are flowcharts illustrating a method for controlling platooning behind a leading vehicle according to an embodiment of the present invention.
Figure 3B:
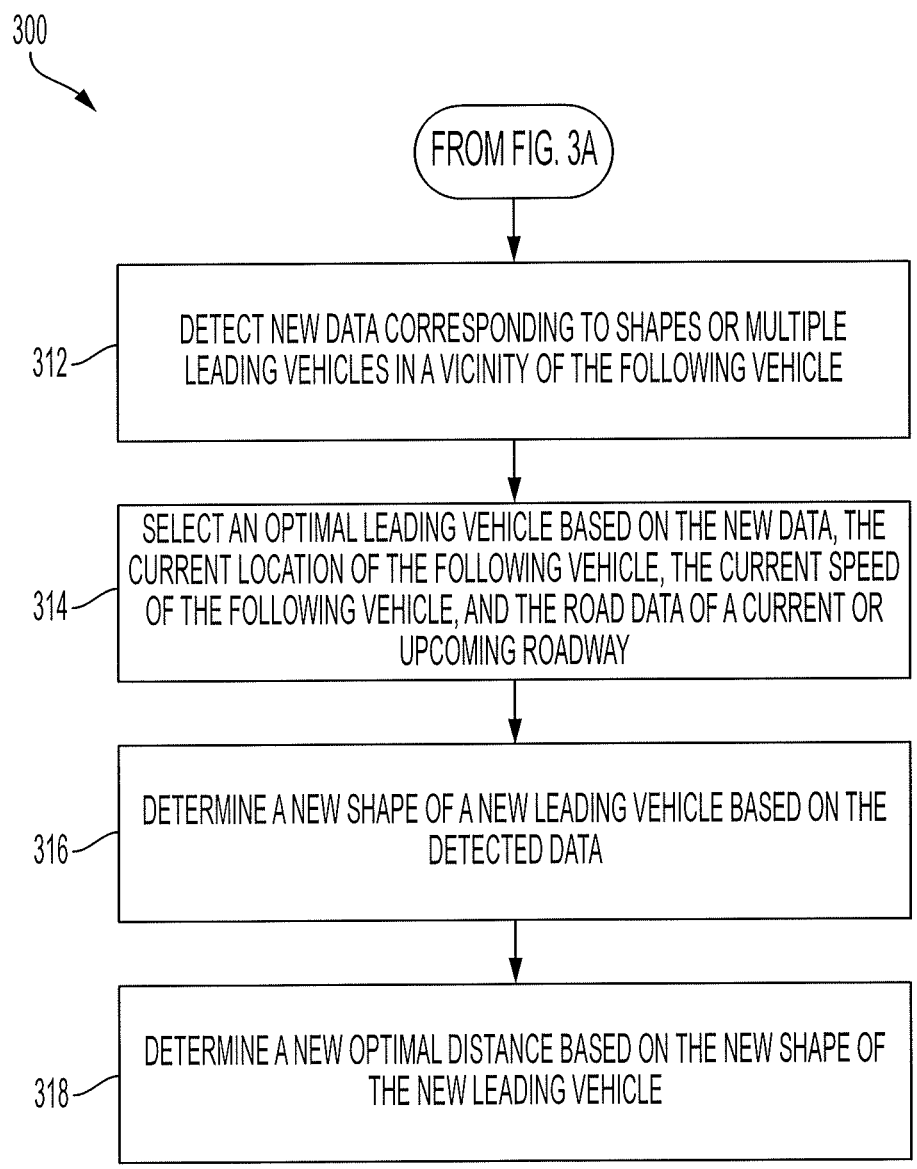

Referring now to FIGS. 3A and 3B, a method 300 may be performed by components of the vehicle 100 to control platooning of the vehicle 100. The method 300 may begin in block 302 in which various sensors of the vehicle may detect data. Such data may include data usable to identify a shape or type of the leading vehicle. For example, this data may include image data corresponding to a shape of the leading vehicle, image data including a license plate of the leading vehicle (which may be used to retrieve a make and model of the vehicle), image data including text having a make and model of the leading vehicle, a wireless signal received from the leading vehicle indicating the make and model of the leading vehicle, or the like. The detected data may further include vehicle data such as a present speed of the vehicle, a present location of the vehicle, present energy efficiency of the present vehicle, or the like. The detected data may also include road data (which may also or instead be received via a network access device, e.g., based on the present location of the vehicle or a navigation route of the vehicle). The road data may include, for example, whether vehicle is traveling through a tunnel, under or over an overpass, a grade of a present road, a curve of the present road, a wind speed and wind direction, a type and intensity of precipitation, a temperature, an elevation (e.g., altitude), or the like. The detected data may further include pressure data from one or more pressure sensor that corresponds to detected pressures at one or more location on the main body of the vehicle. The pressure data may correspond to pressure from a leading vehicle pressure wake, from environmental factors (e.g., wind), or the like.

In block 304, the memory of the vehicle may store data that associates shapes or types of leading vehicles with drag force or wake profile data. As discussed above, this stored data may include lookup tables or calculations. A wake profile of the vehicle (which affects the drag force applied by the vehicle) may change based on the shape of the vehicle and the speed of the vehicle. In that regard, the memory may store data associating drag force or wake profile data for multiple vehicle shapes/types and at multiple speeds. In response to identifying a leading vehicle, the ECU may access the memory to retrieve a corresponding lookup table or equation for the specific leading vehicle.

In block 306, the ECU may determine an optimal distance from the present vehicle to the leading vehicle based on the detected data and the stored data. The optimal distance may correspond to a distance at which the drag force applied by the wake of the leading vehicle is minimized at the following vehicle. For example, the ECU may use image recognition on the detected data to identify a shape or type of the leading vehicle. Based on this information and the detected and stored data, the ECU may determine drag force data or a wake profile of the leading vehicle. In some embodiments, the ECU may access the lookup table for the determined shape or type of the leading vehicle and may compare a portion of the detected and received data to the lookup table to determine the optimal distance. In some embodiments, the ECU may utilize a calculation or determination to adjust the determined optimal distance based on additional detected or stored data (e.g., the ECU may adjust the determined optimal distance based on a grade of the present road, wind speed and direction, or the like). In some embodiments, the ECU may perform a single calculation based on all detected and stored data to determine the optimal distance.

In some embodiments, the ECU may determine or calculate the optimal distance based on some or all of the detected and received data including the pressure data. For example, the ECU may perform a calculation using the detected and received data as inputs and that outputs the optimal distance.

In some embodiments, the ECU may adjust the determined optimal distance based on the detected pressure data. For example, the ECU may calculate a first optimal distance based on the detected and received data (which may include or exclude the pressure data). The ECU may then monitor the pressure data to determine whether a front of the vehicle is in a peak, valley, or midpoint of the pressure wake. Based on this determination, the ECU may increase or decrease the optimal distance to further optimize the distance. Using the pressure data to adjust the determined distance provides advantages as it allows for verification of the calculated optimal distance by measuring the pressure data.

In some embodiments, the ECU may determine the optimal following distance based only, or mainly, on the detected pressure data. For example, the ECU may receive the front and rear pressure data. In response to the front pressure data being greater than nominal and the rear pressure data being less than nominal, the ECU may determine that the following distance can be optimized to increase energy efficiency. The ECU may continuously or periodically adjust the following distance until the rear pressure data is greater than nominal and the front pressure data is less than nominal. The ECU may continue to adjust the following distance until the front pressure data is minimized and the rear pressure data is maximized, so long as the following distance is at least a safe distance behind the leading vehicle.

In some embodiments, autonomous control of the power source may be adjusted based on various additional factors such as based on ride comfort. For example, the ECU may gradually accelerate or decelerate to reach the optimal distance to reduce quick accelerations or decelerations (without such gradual changes in acceleration, a rider may experience a "jerky" feel in the vehicle). As another example, the ECU may select an optimal distance based on user-received factors. These factors may be received from an input device, may be learned as the vehicle is driven by a driver, or the like. The factors may include, for example, a maximum acceleration or deceleration rate of the vehicle, a minimum following distance below which a driver or rider is uncomfortable, or the like. For example, a driver may be uncomfortable being less than 2 seconds behind a leading vehicle; in such situations, the ECU may select an optimal distance that is at least 2 seconds behind the leading vehicle.

In some embodiments, the ECU may select an optimal distance based on detected information corresponding to the environment or based on detected information corresponding to the leading vehicle. For example, the ECU may determine to avoid platooning behind a leading vehicle that is traveling above a posted speed limit. As another example, the ECU may set a limit as to the optimal distance in response to determining that a leading vehicle is being driven by a human (rather than autonomously). For example, the ECU may determine to remain at least 3 seconds behind a driver-operated vehicle, while such limitation may not exist for autonomously-operated vehicles. As yet another example, the ECU may determine to remain at least a preset distance behind a leading vehicle that is accelerating or decelerating unnecessarily.

In block 308, the ECU may control an output device to output data corresponding to the optimal distance. This data may be output in a number of manners. For example, the ECU may control the output device to output a numerical representation of the optimal distance (e.g., 25 yards). As another example, the ECU may control the output device to output a representation of the present vehicle and the leading vehicle and indicate whether the present vehicle should be closer or farther from the leading vehicle. As yet another example, the ECU may control the output device to output light of a first color to indicate that the present vehicle should be closer to the leading vehicle, light of a second color to indicate that the present vehicle should be farther from the leading vehicle, and light of a third color to indicate that the present vehicle is approximately the optimal distance from the leading vehicle.

In block 310, the ECU may control a power source of the vehicle to cause the following vehicle to remain within a predetermined amount of the optimal distance from the leading vehicles. The ECU may perform this operation when the vehicle is operating in a semi-autonomous state, a fully autonomous state, or an adaptive cruise control state. The predetermined amount may correspond to a variation of the optimal distance that still provides a certain amount of improved efficiency. For example, if the optimal distance is 25 yards, the present vehicle may still achieve fuel economy savings (based on the specific drag folders of the pressure wake behind the leading vehicle) when the present vehicle is located between 22 yards and 28 yards of the leading vehicle. In this example, the predetermined amount may be 3 yards. In that regard, the ECU may aim to control the present vehicle to remain 25 yards behind the leading vehicle (as this distance may provide a maximum amount of fuel efficiency benefit) and may at least cause that present vehicle to remain between 22 and 28 yards behind the leading vehicle without sacrificing safety. That is, if the ECU determines that for any reason remaining this distance behind the leading vehicle will present a danger, the ECU may control the vehicle to be a different distance behind the leading vehicle in order to prioritize safety. Safety determinations may be based on various factors such as vehicle speed, whether other vehicles are human-driven or autonomously-driven, or the like.

In some embodiments (e.g., the leading vehicle accelerating and decelerating erratically), it may be difficult for the ECU to comfortably control the vehicle to remain the optimal distance behind the leading vehicle. For example, a passenger may experience discomfort if speed of the present vehicle erratically increases and decreases. In that regard, the ECU may control the present vehicle to accelerate and decelerate at a different rate than the leading vehicle while remaining within the predetermined amount of the optimal distance behind the leading vehicle. Such control of the present vehicle may optimize passenger comfort while still providing fuel efficiency benefits.

In block 312, various sensors of the vehicle may detect new data corresponding to shapes of multiple leading vehicles in the vicinity of the present vehicle. For example, the previous leading vehicle may remain directly in front of the present vehicle, a first potential leading vehicle may be located to the right of the previous leading vehicle, a second potential leading vehicle may be located directly in front of the previous leading vehicle, and a third potential leading vehicle may be located behind the present vehicle. Any vehicle on the roadway for which the present vehicle may determine the shape or type may be selected as a potential leading vehicle.

The data detected in block 312 may include similar data is that detected in block 302. For example, an image sensor may detect image data for each of the potential leading vehicles. They ECU may determine a shape or type of each of the potential leading vehicles using an image recognition algorithm. Various sensors may also detect (and a network access device may receive) additional data such as the present location of the vehicle, a current speed of the vehicle, other vehicle data, or road data.

As referenced above, certain vehicle shapes or types may provide an increase in fuel efficiency relative to other vehicle shapes or types. In that regard and in block 314, the ECU may select an optimal leading vehicle based on the newly detected data, previously detected data, and information indicating optimal leading vehicle shapes or types. For example, the memory may store data indicating that an SUV provides increased fuel efficiency for the present vehicle relative to a sedan. In that regard, the ECU may select any of the potential leading vehicles that is an SUV as a new leading vehicle. As another example, the memory may store data indicating a ranked list of vehicle makes and models. In this example, the ECU may determine the ranking of each potential leading vehicle and may select the highest ranked potential leading vehicle as a new leading vehicle. In some embodiments, the ECU may update the ranking in the memory based on data detected while platooning behind different types of leading vehicles. Such updates may be performed, for example, using an artificial intelligence algorithm.

In some embodiments, the ECU may calculate drag force data or wake profile data for each of the potential leading vehicles based on the detected and received data. In that regard, the ECU may calculate an optimal leading vehicle from the potential leading vehicles. In some embodiments, the vehicles may share information therebetween such as route information of each vehicle. The ECU may determine an optimal leading vehicle based on this shared information and based on any other information. For example, the ECU may select an optimal leading vehicle based on: optimal drag force or wake profile data, which potential leading vehicle will be traveling along a route of the present vehicle for a longest distance, whether the leading vehicles are traveling in an autonomous or semiautonomous mode, whether the leading vehicles are utilizing adaptive cruise control, the lowest speed fluctuation of the leading vehicles, or the like. The ECU may also or instead determine an optimal leading vehicle based on a speed of the potential leading vehicles (some speeds may provide increased fuel efficiency benefits relative to other speeds). The ECU may also or instead determine an optimal leading vehicle based on which potential leading vehicle is traveling at a speed closest to a preferred speed of a driver or passenger of the present vehicle.

In block 316, the ECU may determine a shape of a new leading vehicle based on the detected data. The new leading vehicle may be a vehicle selected in block 314 as an optimal leading vehicle or may be a new vehicle behind which the present vehicle is traveling. For example, if a third vehicle merges between the present vehicle and a previous leading vehicle then the ECU may select the third vehicle as the new leading vehicle.

In block 318, the ECU may determine a new optimal distance between the present vehicle and the new leading vehicle based on the shape of the new leading vehicle and any additional detected or received data. This determination may be performed in a similar manner as block 306, and may be further adjusted based on the detected pressure data.

Figures 4A, 4B:
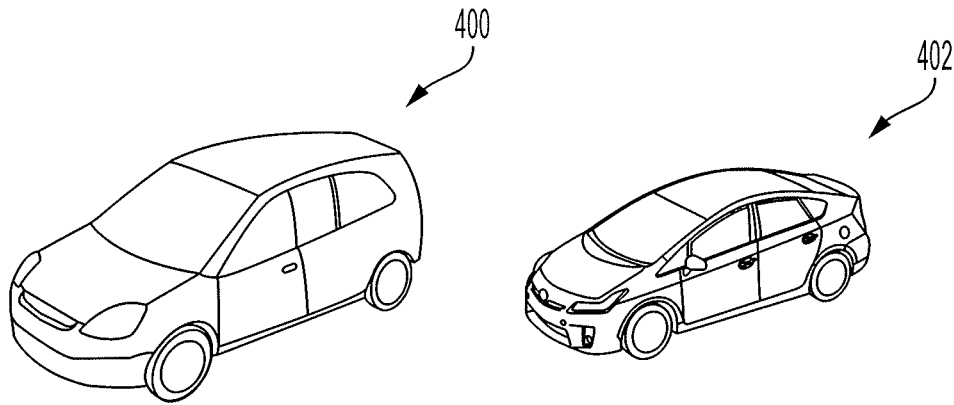
FIG. 4A illustrates an exemplary leading vehicle and an exemplary following vehicle implementing the features of the present disclosure according to an embodiment of the present invention.
FIG. 4B illustrates dimensions of various leading vehicles according to an embodiment of the present invention.
Figure 4C:
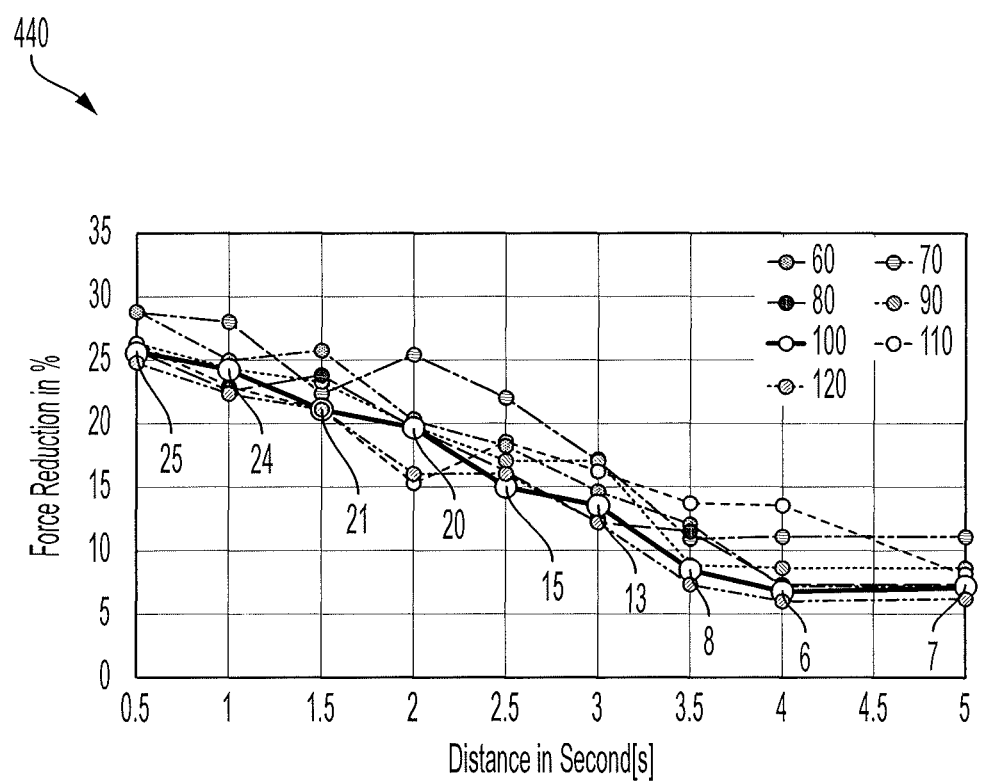
FIG. 4C illustrates fuel efficiency savings of the following vehicle of FIG. 4A implementing the method of FIGS. 3A and 3B according to an embodiment of the present invention.

Referring now to FIGS. 4A, 4B, and 4C, experiments were performed using the method 300 of FIGS. 3A and 3B to verify operation of the method (excluding the pressure data from the pressure sensors; use of pressure data may further optimize the method 300). The experiments verified the functionality of the method. In a specific experiment, a light sedan (following vehicle) 402 was controlled to platoon behind a minivan (leading vehicle). A table 420 illustrates a length (along a longitudinal axis) and a frontal area of various Toyota® vehicles, and these values were used to calculate drag force and wake profile data of each of the vehicles. In particular, these values were used to calculate the drag force and wake profile data of the minivan 400 used in the experiments. During implementation of the method 300 of FIGS. 3A and 3B, the light sedan 402 may detect image data corresponding to the leading vehicle (minivan 400), may identify characteristics of the minivan 400 based on the image data (e.g., an identification of the minivan 400, a calculation of the frontal area of the minivan 400, etc.), and may determine drag force or wake profile data corresponding to the minivan 400 based on the identified characteristics. The light sedan 402 may then determine an optimal following distance between the light sedan 402 and the minivan 400 and may either output information corresponding to the optimal distance or may control the light sedan 402 to remain the optimal distance behind the minivan 400.

A table 440 illustrates a percentage of force reduction experienced by the light sedan 402 based on various speeds of the vehicles (measured in kilometers per hour) and based on a distance between the light sedan 402 and the minivan 400 (measured in seconds). The distance is measured in seconds and refers to a quantity of seconds for the following vehicle to cover the distance between the following vehicle and the leading vehicle. The percentage of force reduction illustrates a difference in an amount of force required by the light sedan 402 to maintain speed in the platooning situation relative to a nominal, or non-platooning, situation (e.g., without a leading vehicle). As shown, the reduction in force required by the light sedan 402 is non-linear and varies based on the speed of the vehicles and the following distance. This illustrates that the optimal distance may vary based on the speed and following distance.

Referring now to FIGS. 4A, 5A, 5B, and 5C, a specific force calculation is determined for the light sedan 402 traveling at various distances between the minivan 400 at 110 kilometers per hour. As shown in a plot 500, the determined force required to maintain speed of the sedan 401 is non-linear and varies based on the distance behind the minivan 400. The force generally increases with distance but distances exist which provide significant savings over adjacent distances.

Figure 5A:
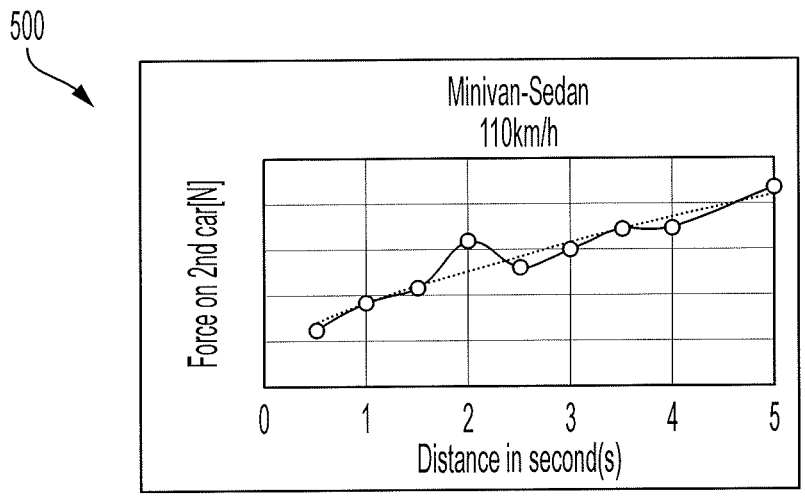
FIG. 5A is a graph illustrating an amount of force required by the following vehicle of FIG. 4A to maintain a constant speed based on a distance between the leading vehicle and the following vehicle of FIG. 4A according to an embodiment of the present invention.
Figure 5B:
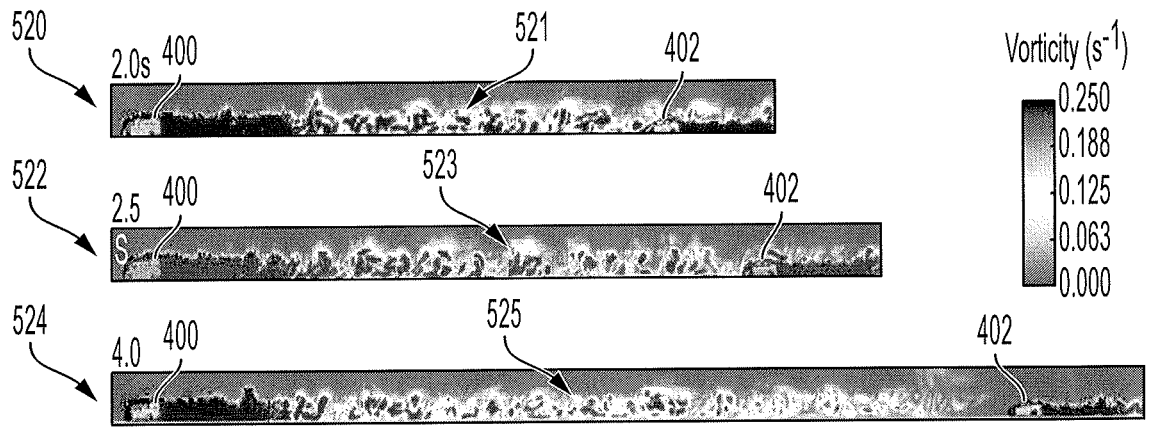
FIG. 5B is a drawing showing wake profiles behind the leading vehicle of FIG. 4A and its impact upon the following vehicle of FIG. 4A at various distances between the vehicles according to an embodiment of the present invention.

Wake profile data is shown in FIG. 5B that illustrates the reasoning for this non-linearity. In particular, a first wake profile 520 illustrates the pressure wake 521 behind the minivan 400 and its impact upon the light sedan 402 at a distance of 2 seconds, a second wake profile 522 illustrates the pressure wake 523 behind the minivan 400 and its impact upon the light sedan 402 at a distance of 2.5 seconds, and a third wake profile 524 illustrates the pressure wake 525 behind the minivan 400 and its impact upon the light sedan 402 at a distance of 4 seconds. As shown, the pressure wakes have peaks and valleys that reach the light sedan 402 at different locations based on the following distance. Furthermore, the pressure wakes generally reduce as the distance increases.

Figure 5C:
FIG. 5C is a close-up view of the impact of the wake profile of the leading vehicle of FIG. 4A as it contacts the following vehicle of FIG. 4A at a first time according to an embodiment of the present invention.
Figure 5D:
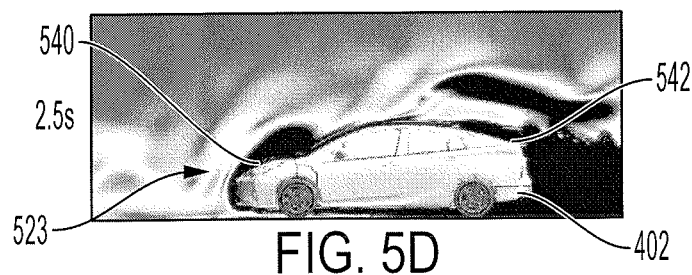
FIG. 5D is a close-up view of the impact of the wake profile of the leading vehicle of FIG. 4A as it contacts the following vehicle of FIG. 4A at a second time according to an embodiment of the present invention.

Referring to FIGS. 5B and 5C, the pressure wake 521 reaches the light sedan 402 in such a way that a greater amount of pressure is applied towards a front 540 of the light sedan 402 than towards a rear 542 of the light sedan 402. Referring now to FIGS. 5B and 5D, the pressure wake 523 reaches the light sedan 402 in such a way that a greater amount of pressure is applied towards the rear 542 of the light sedan 402 than towards the front 540 of the light sedan 402. As described above, fuel efficiency savings are optimized by reducing pressure applied to a front of a vehicle and increasing pressure applied to a rear of the vehicle. Accordingly, the reduction in force required for the light sedan 402 to maintain its speed is greater (an advantage) at 2.5 seconds than at 2 seconds due to the location of the light sedan 402 in the pressure wake behind the minivan 400.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling platooning by a following vehicle, the system comprising:
a main body of the following vehicle;
a pressure sensor located in or on the main body and configured to detect a pressure corresponding to a pressure wake from a leading vehicle;
a sensor located in or on the main body and configured to detect data related to a plurality of shapes of a plurality of respective vehicles within a predetermined area near the following vehicle, the plurality of shapes of the plurality of respective vehicles including a shape of the leading vehicle; and
an electronic control unit (ECU) located in or on the main body, coupled to the pressure sensor and the sensor, and configured to:
select the leading vehicle from the plurality of respective vehicles as an optimal leading vehicle to follow based on the detected data related to the plurality of shapes of the plurality of respective vehicles,
determine a wake profile of the leading vehicle based on the detected data related to the shape of the leading vehicle in response to the selection of the leading vehicle as the optimal leading vehicle to follow, and
determine an optimal distance from the following vehicle to the leading vehicle based on the detected pressure and the determined wake profile, the optimal distance corresponding to a distance at which drag applied to the following vehicle is reduced based on the pressure wake from the leading vehicle.

2. The system of claim 1, wherein:
the main body includes a front end and a rear end;
the pressure sensor includes a first pressure sensor located closer to the front end than the rear end; and
the pressure sensor includes a second pressure sensor located closer to the rear end than the front end.

3. The system of claim 2, wherein:
the main body includes a grill towards the front end and a windshield; and
the first pressure sensor is located at least one of on the grill or on the windshield.

4. The system of claim 3, wherein:
the pressure sensor includes a third pressure sensor located on the grill; and
the first pressure sensor is located on the windshield.

5. The system of claim 3, wherein the ECU is further configured to determine the optimal distance to be a distance at which a first pressure detected by the first pressure sensor is less than a second pressure detected by the second pressure sensor.

6. The system of claim 1, wherein the ECU is further configured to determine the optimal distance based on the shape of the leading vehicle.

7. The system of claim 1, further comprising at least one of:
a location sensor located in or on the following vehicle and configured to detect data corresponding to a current location of the following vehicle; or
a speed sensor located in or on the following vehicle and configured to detect a speed of the following vehicle; and
wherein the ECU is further configured to determine the optimal distance based on at least one of the current location of the following vehicle or the speed of the following vehicle.

8. The system of claim 7, wherein the ECU is further configured to determine the optimal distance based on the current location of the following vehicle and the speed of the following vehicle.

9. The system of claim 8, wherein at least one of the sensor or another sensor is configured to detect road data on a current or upcoming roadway of the following vehicle, the road data including at least one of:
a tunnel;
an overpass;
a grade;
a curve;
a wind speed;
a wind direction;
precipitation;
a temperature; or
an elevation, and
wherein the ECU is further configured to determine the optimal distance based on the detected road data.

10. The system of claim 1, further comprising:
an output device located in or on the following vehicle and configured to output data corresponding to the optimal distance; and
a power source located in or on the following vehicle and configured to propel the following vehicle along a roadway; and
wherein the ECU is further configured to at least one of:
control the output device to output the data corresponding to the optimal distance, or
control the power source to cause the following vehicle to remain within a predetermined distance of the optimal distance relative to the leading vehicle.

11. A system for controlling platooning by a following vehicle, the system comprising:
a main body of the following vehicle having a front end and a rear end;
a first pressure sensor and a second pressure sensor each located in or on the main body and configured to detect pressure data corresponding to at least a portion of a pressure wake from a leading vehicle, the first pressure sensor being located closer to the front end than the second pressure sensor;
a sensor located in or on the main body and configured to detect data related to a plurality of shapes of a plurality of respective vehicles within a predetermined area near the following vehicle, the plurality of shapes of the plurality of respective vehicles including a shape of the leading vehicle; and
an electronic control unit (ECU) located in or on the main body, coupled to the first pressure sensor, the second pressure sensor, and the sensor, and configured to:
select the leading vehicle from the plurality of respective vehicles as an optimal leading vehicle to follow based on the detected data related to the plurality of shapes of the plurality of respective vehicles,
determine a wake profile of the leading vehicle based on the detected data related to the shape of the leading vehicle in response to the selection of the leading vehicle as the optimal leading vehicle to follow, and
determine an optimal distance from the following vehicle to the leading vehicle based on the pressure data and the determined wake profile, the optimal distance corresponding to a distance at which drag applied to the following vehicle is reduced based on the pressure wake from the leading vehicle.

12. The system of claim 11, wherein the ECU is further configured to determine the optimal distance based on the shape of the leading vehicle.

13. A method for controlling platooning by a following vehicle, the method comprising:
  detecting, by a pressure sensor located on or in the following vehicle, a pressure corresponding to a pressure wake from a leading vehicle;
  detecting, by a sensor located in or on a main body of the following vehicle, data related to a plurality of shapes of a plurality of respective vehicles within a predetermined area near the following vehicle, the plurality of shapes of the plurality of respective vehicles including a shape of the leading vehicle;
  selecting, by an electronic control unit (ECU) located on or in the following vehicle and coupled to the pressure sensor and the sensor, the leading vehicle from the plurality of respective vehicles as an optimal leading vehicle to follow in response to detecting the data related to the plurality of shapes of the plurality of respective vehicles;
  determining, by the ECU, a wake profile of the leading vehicle in response to detecting the data related to the shape of the leading vehicle and selecting the leading vehicle as the optimal leading vehicle to follow; and
  determining, by the ECU, an optimal distance from the following vehicle to the leading vehicle in response to detecting the pressure and determining the wake profile, the optimal distance corresponding to a distance at which drag applied to the following vehicle is reduced based on the pressure wake from the leading vehicle.

14. The method of claim 13, wherein the pressure sensor includes a first pressure sensor located closer to a front end of the following vehicle than a rear end of the following vehicle and a second pressure sensor located closer to the rear end than the front end.

15. The method of claim 14, wherein the first pressure sensor is located at least one of on a grill on the following vehicle or on a windshield on the following vehicle.

16. The method of claim 14, wherein determining the optimal distance includes determining a distance (i) at which a first pressure detected by the first pressure sensor is less than a second pressure detected by the second pressure sensor and (ii) which is equal to or greater than a threshold distance.

17. The method of claim 13, wherein determining the optimal distance includes determining the optimal distance based on the shape of the leading vehicle.

18. The method of claim 13, further comprising at least one of:
  outputting, by an output device on or in the following vehicle, data corresponding to the optimal distance; or
  controlling, by the ECU, a power source on or in the following vehicle to cause the following vehicle to remain within a predetermined distance of the optimal distance relative to the leading vehicle.

* * * * *